(12) United States Patent
Klein (10) Patent No.: US 12,010,020 B2
(45) Date of Patent: Jun. 11, 2024

(54) SYSTEM AND METHOD FOR STORING DATA USING SOFTWARE DEFINED NETWORKS

(71) Applicant: Kioxia Corporation, Tokyo (JP)

(72) Inventor: Yaron Klein, Raanana (IL)

(73) Assignee: KIOXIA CORPORATION, Tokyo (JP)

( * ) Notice: Subject to any disclaimer, the term of this patent is extended or adjusted under 35 U.S.C. 154(b) by 588 days.

(21) Appl. No.: 17/008,090

(22) Filed: Aug. 31, 2020

(65) Prior Publication Data

US 2020/0403916 A1 Dec. 24, 2020

Related U.S. Application Data

(63) Continuation of application No. 15/900,585, filed on Feb. 20, 2018, now Pat. No. 10,764,180.

(51) Int. Cl.
*H04L 45/745* (2022.01)
*H04L 49/25* (2022.01)
*H04L 61/5007* (2022.01)

(52) U.S. Cl.
CPC .......... *H04L 45/745* (2013.01); *H04L 49/25* (2013.01); *H04L 61/5007* (2022.05)

(58) Field of Classification Search
CPC .... H04L 45/745; H04L 61/5007; H04L 49/25
See application file for complete search history.

(56) References Cited

U.S. PATENT DOCUMENTS

| | | | |
|---|---|---|---|
| 6,604,148 B1 | 8/2003 | Dennison | |
| 7,020,796 B1 | 3/2006 | Ennis et al. | |
| 9,003,071 B2 | 4/2015 | Liu | |
| 9,819,515 B1 | 11/2017 | Seal et al. | |
| 2006/0120517 A1 | 6/2006 | Moon et al. | |
| 2010/0228946 A1 | 9/2010 | Byers et al. | |
| 2014/0188953 A1 | 7/2014 | Lin et al. | |
| 2014/0195634 A1 | 7/2014 | Kishore et al. | |
| 2014/0241356 A1 | 8/2014 | Zhang et al. | |
| 2014/0282944 A1* | 9/2014 | Li | H04L 41/40 726/11 |
| 2015/0263899 A1* | 9/2015 | Tubaltsev | H04L 45/02 370/254 |
| 2015/0341253 A1 | 11/2015 | Scheurich et al. | |
| 2015/0363109 A1 | 12/2015 | Frick et al. | |
| 2016/0301601 A1 | 10/2016 | Anand et al. | |
| 2018/0004437 A1* | 1/2018 | Battaje | G06F 12/1027 |
| 2018/0013660 A1* | 1/2018 | Kutergin | H04L 61/4552 |
| 2018/0191721 A1* | 7/2018 | Freyensee | H04L 9/0866 |
| 2018/0284989 A1 | 10/2018 | Kachare et al. | |
| 2019/0121543 A1 | 4/2019 | Frolikov | |
| 2019/0227744 A1* | 7/2019 | Olarig | G06F 11/1076 |

FOREIGN PATENT DOCUMENTS

| | | | | |
|---|---|---|---|---|
| CN | 102239476 A | * | 11/2011 | ....... G06F 17/30091 |
| CN | 104468181 A | | 3/2015 | |
| KR | 101729944 B1 | * | 4/2017 | |

* cited by examiner

*Primary Examiner* — Samina F Choudhry
(74) *Attorney, Agent, or Firm* — Foley & Lardner LLP (57) ABSTRACT

A system for storing data includes a controller, an Ethernet switch and a storage device. The controller is configured to receive data routing instructions, and manage forwarding rules of a switch forwarding table to implement the data routing instructions. The Ethernet switch is configured to receive data, access the switch forwarding table, and route the data to the storage device using the switch forwarding table.

17 Claims, 8 Drawing Sheets

SYSTEM AND METHOD FOR STORING DATA USING SOFTWARE DEFINED NETWORKS

CROSS-REFERENCE TO RELATED APPLICATIONS

The present application is a continuation of U.S. patent application Ser. No. 15/900,585 filed Feb. 20, 2018, now U.S. Pat. No. 10,764,180, the contents of which are incorporated herein by reference in their entirety.

TECHNICAL FIELD

The present disclosure generally relates to systems and methods for storing data, including storage systems and methods that implement a software defined network (SDN) to manage a switch forwarding table used by an Ethernet switch.

BACKGROUND

Some comparative solid state drive (SSD) devices maintain legacy hard disk drive (HDD) mechanical features, including electrical features (e.g. SAS (Serial Attached SCSI (Small Computer System Interface)) and SATA (Serial Advanced Technology Attachment) buses) and software features (e.g. drivers) for backward compatibility. Some comparative systems and methods for routing data in, or to, such storage devices may have certain drawbacks. For example, as described in more detail herein, some comparative systems and methods involve a controller being in an incoming data path (an "in-path" controller), which can result in a bottleneck due to the controllers limited data processing capabilities. Some other comparative systems and methods do not implement an in-path controller, but also do not provide for virtualized management of data routing. One or more of the embodiments described herein address these and other issues.

BRIEF DESCRIPTION

According to certain aspects, one or more embodiments described herein are directed to systems and methods for storing data, using an SDN mechanism to manage a switch forwarding table used by an Ethernet switch in a storage system. A controller of the storage system (e.g. a controller not in a data path of incoming data to be routed) can manage switch forwarding rules of the switch forwarding table, and an Ethernet switch can route the incoming data using the switch forwarding table. This can provide for virtualization of the routing and storage process.

In one or more embodiments according to a first aspect, a system for storing data includes a controller, an Ethernet switch and storage devices. The controller is configured to receive data routing instructions, and manage forwarding rules of a switch forwarding table to implement the data routing instructions. The Ethernet switch is configured to receive data, access the switch forwarding table, and route the data to and from the storage devices using the switch forwarding table.

In one or more embodiments according to another aspect, a method for storing data, includes receiving, by a controller of a storage system, a request for a new namespace, selecting, by the controller, a first drive for the new namespace, and creating, by the controller, a first physical namespace on the first drive as the new namespace. The method further includes assigning, by the controller, a virtual internet protocol (IP) address to the first physical namespace, and modifying or creating, by the controller, one or more entries of a switch forwarding table accessible to a switch to cause the switch to route data corresponding to the virtual IP address to the first physical namespace.

In one or more embodiments according to another aspect, a method for storing data includes receiving, by a controller of a storage system, a request to migrate data from a first physical namespace to a second physical namespace, the first namespace corresponding to a virtual IP address, and selecting, by the controller of the storage system, a source Ethernet drive on which the first physical namespace resides, the source Ethernet drive comprising one or more Ethernet controllers configured to functions as a non-volatile memory express over fiber (NVMeoF) initiator. The method further includes selecting, by the controller of the storage system, a target Ethernet drive comprising one or more Ethernet controllers configured to functions as an NVMeoF target, creating, by the controller of the storage system, the second physical namespace on the target Ethernet drive, transmitting, by the controller of the storage system, a command to the source Ethernet drive to copy data from the first physical namespace to the second physical namespace of the target Ethernet drive using an Ethernet switch, and setting, by the controller of the storage system, the virtual IP address to correspond to the second physical namespace.

DETAILED DESCRIPTION

The embodiments described herein provide for certain improvements, including providing for virtualization of routing control of a storage system and use of a controller that is not in-path. One or more of the embodiments provided herein implement an SDN to control routing in a storage system. Generally speaking, an SDN separates control functions from data functions for networking devices (e.g. packet switches, local area network (LAN) switches, and routers) using an Application Programming Interface (API) to implement communications between the control functions and the data functions. In some comparative storage systems, network devices handle both data and control functions, and such network devices can make it difficult to implement virtualization (e.g. for substantial administrator control of data routing, network infrastructure, and other operations through a virtual network) on a large scale.

In some SDNs, a central controller performs many high level functions, such as security checks, naming, policy declaration, and routing. In data routing, for example, this can allow for offloading the high level functions to the controller, and can allow for implementing relatively simple switches. For example, switches (e.g. Ethernet switches) can reference flow tables or "switch forwarding tables" to direct incoming data, and the controller (or a plurality of controllers) can manage the switch forwarding tables to control routing (e.g. to implement an administrator's instructions). The storage systems and methods described herein, which can provide for having one or more central controllers manage the high level functions of a routing system, can allow for virtualized control even on large, scaled-out systems.

In one or more embodiments described herein, the SDN implements an OpenFlow specification (as defined and occasionally updated in the OpenFlow Switch Specification, regularly published by the Open Networking Foundation as of the date of filing of this specification). OpenFlow includes a protocol for communication between SDN controllers and network devices, and a specification as to a logic structure of the network switch functions, and can be used to implement at least some of the systems and methods described herein. OpenFlow allows for use of a switch forwarding table, as described in more detail below in reference to FIG. 2. In some embodiments, other protocols and/or logic structures can be used in place of, or in addition to, OpenFlow.

Figure 1A:
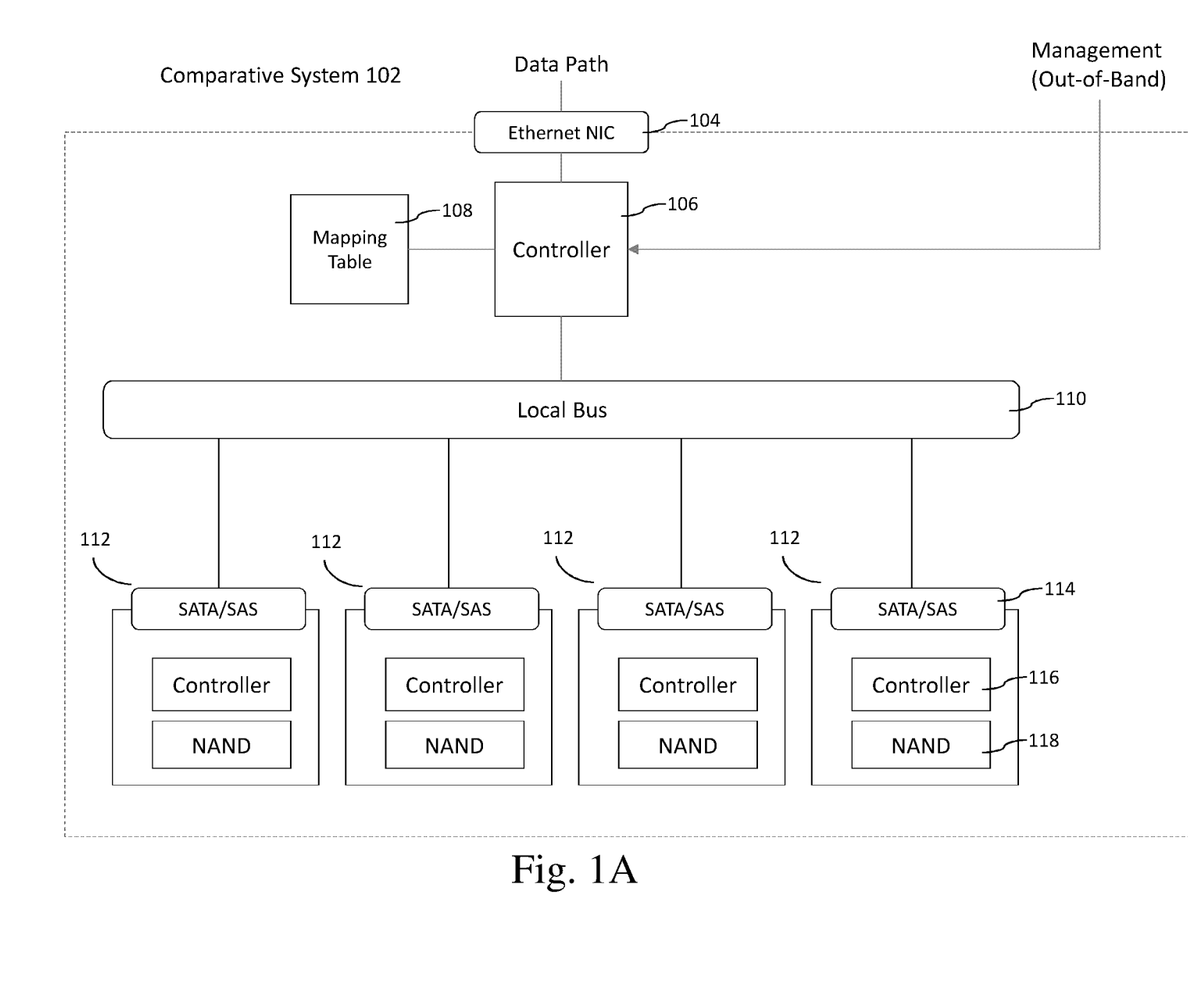
FIG. 1A shows a block diagram of a comparative data storage system including a controller in a data path of incoming data to be routed.

Referring now to FIG. 1A, a comparative system 102 for storing data includes an Ethernet network interface controller (NIC) 104, a controller 106, a mapping table 108, a local bus 110, and a plurality of drives 112. The comparative system 102 may be, for example, a data storage system in which data is stored, and retrieved from, the drives 112. The comparative system 102 provides for a data path wherein incoming data flows from the Ethernet NIC 104 to the controller 106, which routes the data to one or more of the drives 112 using the local bus 110. The comparative system 102 may be implemented in, for example, a data center, a local data network, a computer system, or in any other appropriate system or network.

The Ethernet NIC 104 can function as an interface between the system 102 and an external device or network, and can receive incoming data and pass that data to the controller 106. The Ethernet NIC 104 can implement, for example, an internet small computer systems interface (iSCSI) or fiber channel (FC) port.

The controller 106 may be, for example, a centralized controller configured to receive out-of-band management including, for example, data routing instructions or policies. The controller 106 can update a mapping table 108 (e.g. stored in computer memory accessible to the controller 106) according to the data routing instructions or policies. The controller 106 can receive data from the Ethernet NIC 104, and can process the data (e.g. can implement transport protocol decapsulation and storage processing), reference the mapping table 108, and route the data accordingly. The controller 106 can be configured to intercept a storage layer of the incoming data and to manipulate address space or the data itself to provide storage functionality. For example, address manipulation can be striping (e.g. redundant array of independent disks "0" (RAID-0)), mirroring (e.g. RAID-1), or any other storage virtualization functionality.

The local bus 110 can be used by the controller 106 to route data from the controller 106 to one or more of the drives 112, or to route data between the drives 112, and can provide for fan-out functionality for the controller 106. The local bus may be SAS or SATA compatible.

The drives 112 (e.g. storage drives) may each include a SATA or SAS interface 114, a controller 116, and NAND type flash memory 118 (or any other appropriate type of computer memory).

Among other things, the present Applicant recognizes that the above-described processing and routing by the controller 106 can constitute a bottleneck in storage efficiency. The controller 106 is in the data path and must perform processing on the incoming data prior to routing the data. The controller 106 may be configured for multiple functionalities, including processing the out-of-band management and updating the mapping table 108. As such, the controller 106 may lack some of the advantages of a specialized routing device that is not configured for such processing. Thus, the comparative system 102 may be less efficient or effective than desired.

Figure 1B:
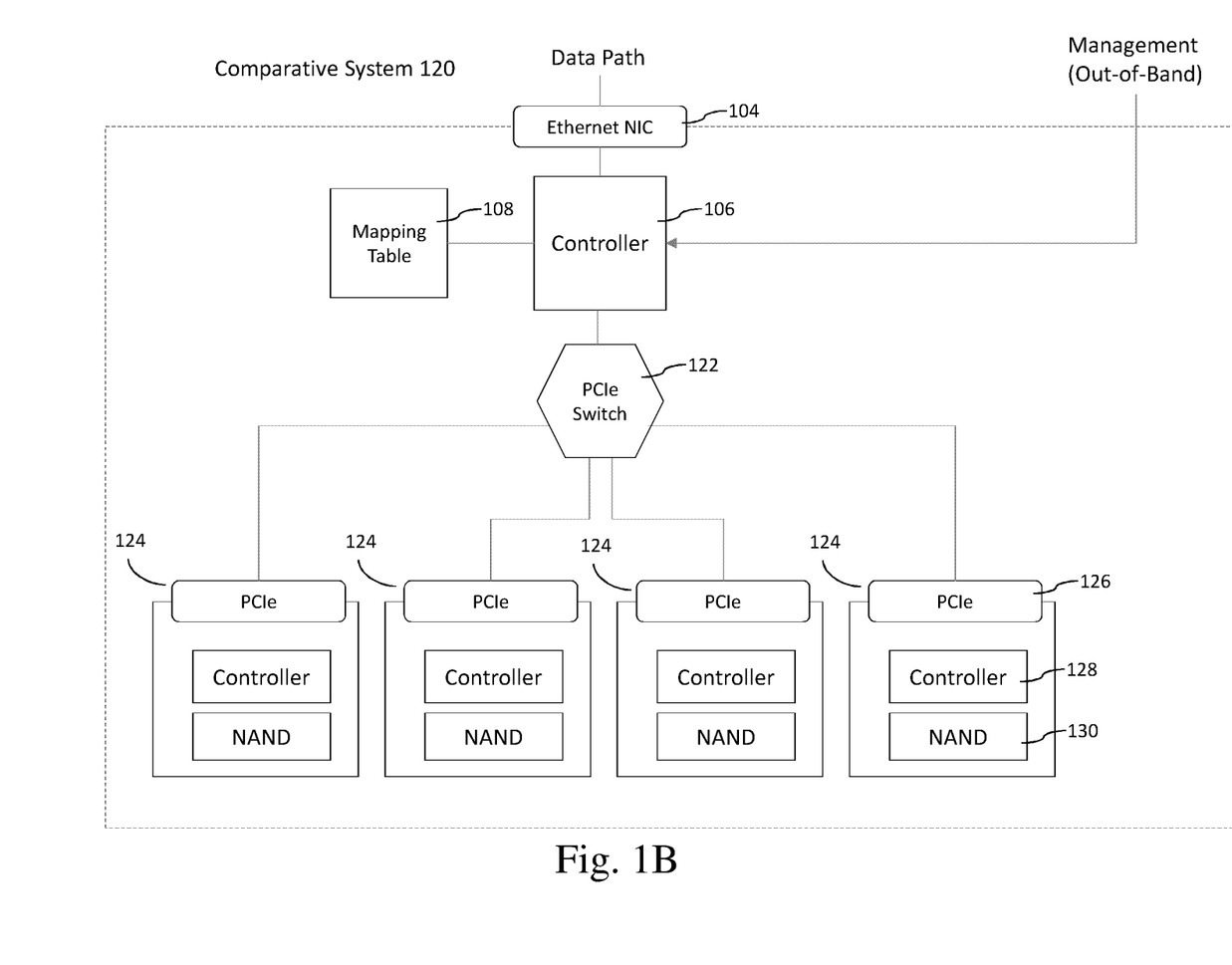
FIG. 1B shows a block diagram of another comparative data storage system including a controller in a data path of incoming data to be routed.

Refer now to FIG. 1B, which shows a comparative storage system 120 that implements a peripheral component interconnect express (PCIe) switch. The comparative system 120 includes an Ethernet NIC 104, a controller 106, and a mapping table 108 (e.g. similar to, or the same as, those components described above in reference to FIG. 1A), as well as a PCIe switch 122 and a plurality of non-volatile memory express (NVMe) drives 124. The NVMe drives 124 may each include a PCIe interface 126, a controller 128, and NAND-type memory 130.

The comparative system 120 offers some improvements over the comparative system 102 by implementing the PCIe switch 122 and the NVMe drives 124, which can provide for between performance, capacity, and/or density. For example, the NVMe drives 124 may have improved form factors and their PCIe interface 126 can provide for higher bandwidth. Furthermore, the NVMeoF protocol can be used to further increase performance.

However, the controller 106 of the comparative system 120 is still in the data path. As discussed above, the present Applicant recognizes that this can be a bottleneck in terms of the performance of the comparative system 120 (e.g. because the non-specialized controller 106 is used to process the incoming data).

Figure 1C:
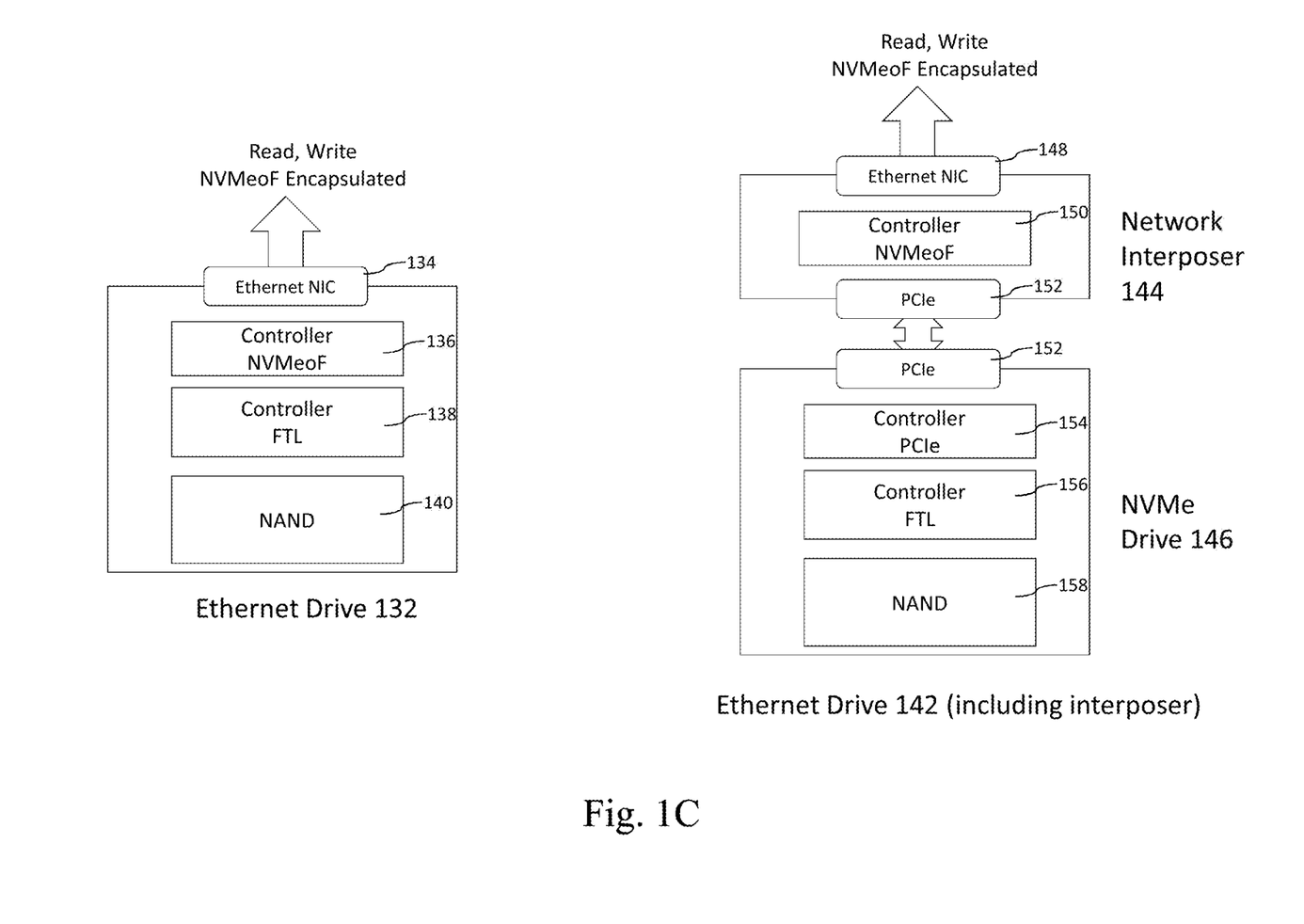
FIG. 1C shows a block diagram of a comparative data storage system that includes a network interposer.

Referring now to FIG. 1C, another comparative approach is to implement an Ethernet drive 132 or an Ethernet drive 142 with an interposer. As shown in FIG. 1C, the Ethernet drive 132 includes an Ethernet NIC 134, a controller 136 configured for NVMeoF, a controller flash translation layer (FTL) 138, and a NAND-type memory 140.

The Ethernet NIC 134 is an interface between the Ethernet drive 132 and a host. Thus, the host can access the Ethernet drive 132 directly. To implement this, the controller 136 is configured for NVMeoF functionality. The controller 136 makes use of the controller FTL 138, which maps host side or file system logical block addresses to physical addresses of the NAND-type memory 140. Thus, NVMeoF transport can be offloaded to the Ethernet drive 132 itself, and hosts can access the Ethernet drive 132 directly without the overhead of computation required for protocol translation.

Referring now to the Ethernet drive 142, the Ethernet Drive 142 includes a network interposer 144 and an NVMe drive 146. The network interposer 144 can include an Ethernet NIC 148 that serves as an interface between the Ethernet drive 142 and a host, a controller 150 configured for NVMeoF protocol, and a PCIe interface 152. The NVMe drive 146 includes another PCIe interface 152 configured to communicate with the PCIe interface 152 of the network interposer, a controller configured to implement PCIe 154, a controller FTL 156, and a NAND-type memory 158. Thus, an NVMe drive 146 can be implemented with a network interposer 144 that provides for a host to communicate directly with the Ethernet drive 142. Read and write functionality can thus be implemented with NVMeoF.

However, the present Applicant recognizes that the configurations shown in FIG. 1C for the Ethernet drive 132 and the Ethernet drive 142 can be computationally demanding on the NVMeoF-configured controllers. As in the systems shown in FIG. 1A and FIG. 1B, the Ethernet drive 132 and the Ethernet drive 142 implement controllers that are in an incoming data path. As such, bottlenecks of the type discussed above may occur as data passes through those controllers.

Figure 2:
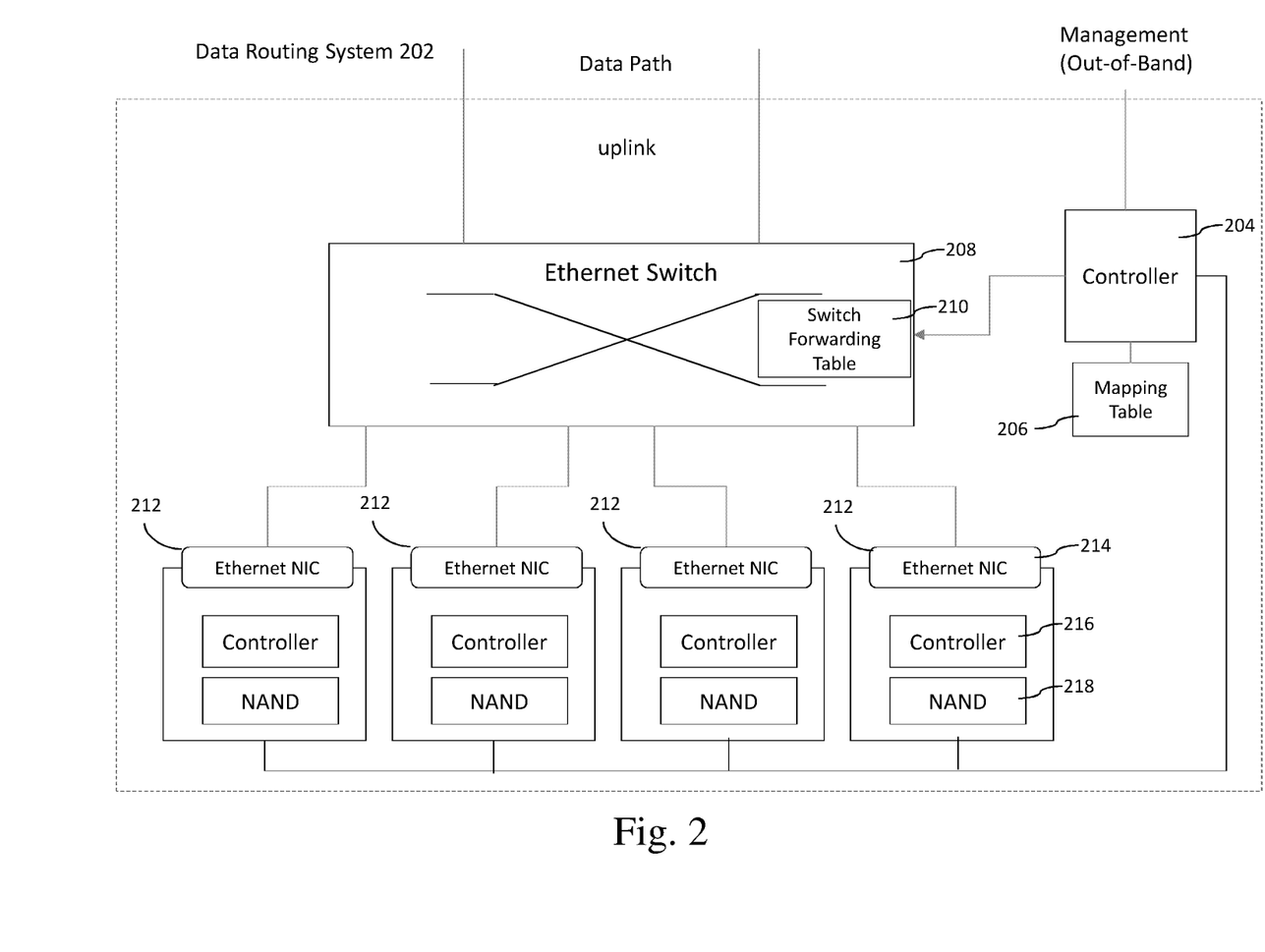
FIG. 2 shows a block diagram of a data storage system according to one or more embodiments of the present disclosure.

FIG. 2 shows an example data storage system 202 according to one or more embodiments of the present disclosure. In one or more embodiments, the data routing system 202 includes a controller 204, a mapping table 206, an Ethernet switch 208, a switch forwarding table 210, and a plurality of Ethernet drives 212. Other embodiments contain additional or fewer components than shown in FIG. 2. The data storage system 202 provides for a controller outside of an incoming data path that manages a switch forwarding table using OpenFlow, and an Ethernet switch that references the switch forwarding table to route the incoming data to one or more Ethernet drives. This configuration provides for out-of-band management and virtualized control of the storage system via the controller, and provides for improved performance by implementing the dedicated Ethernet switch and by omitting use of a centralized controller in the data path.

In one or more embodiments, the controller 204 can be configured to receive instructions or commands from an administrator or external device, network, or host. These instructions or commands can constitute out-of-band management. The controller 204 can provide for centralized control of the data storage system 202 through which routing can be managed externally. Thus, virtualized management of the data storage system 202 can be implemented, allowing an administrator significant control over data routing and providing for improved management of large-scale systems by implementing policies that affect system-wide routing through the centralized controller 204.

The instructions received by the controller 204 may include reference to a virtual IP address, and the controller 204 can be configured to reference and manage the mapping table 206 (which is, for example, a data structure stored in computer memory accessible to the controller 204) to determine a physical address that corresponds to the virtual IP address. Each virtual IP address corresponds to a virtual namespace. A namespace can be a quantity of non-volatile memory that may be formatted into logical blocks. When formatted, a namespace of size n is a collection of logical blocks with logical block addresses from 0 to (n−1). A namespace may also be referred to as a block device, or as a volume of a disk, drive, or other memory device. The physical address may specify one or more of the Ethernet drives 212, and may specify one or more namespaces residing on the specified one or more of the Ethernet drives 212. Thus, by using the mapping table 206 the controller 204 can implement policies or instructions related to physical addresses and namespaces that correspond to virtual IP addresses referenced by an external host, and the external host need not necessarily know the corresponding physical address and namespace.

In one or more embodiments, the controller 204 is configured to manage the switch forwarding table 210 to implement the received instructions or policies. For example, the controller 204 may use an SDN mechanism such as OpenFlow to add, delete, or modify entries in the switch forwarding table 210. OpenFlow has a large set of matching rules that can be implemented, including wild cards for matching IP addresses and MAC addresses, protocol, or port numbers. OpenFlow actions include packet forwarding to a specific switch port, dropping the packet, sending the packet to the controller 204, or modifying the packet (e.g. changing the source/destination Mac/IP addresses). Alternatively, the controller 204 may use another policy to manage the switch forwarding table 210. Thus the controller 204 need not directly control the Ethernet switch 208, although in some embodiments such control can be implemented. The controller 204 can specify an expiry time for entries in the switch forwarding table 210. The controller 204 can update, delete, or extend the validity of the existing rules at any time.

In one or more embodiments, the controller 204 can also be configured to communicate with one or more of the Ethernet drives 212 via $I^2C$. For example, the controller 204 can implement an NVMe-MI configuration to create, delete, or modify namespaces on the one or more Ethernet drives 212, or can gather log information from the one or more Ethernet drives 212.

In one or more embodiments, the Ethernet switch 208 may be configured to receive incoming data (e.g. may be in the incoming data path), and may be configured to reference the switch forwarding table 210 to determine how to route or otherwise manage the incoming data. In some embodiments, the Ethernet switch 208 is not configured to directly communicate with the controller 204. Based on information referenced in the switch forwarding table 210, the Ethernet switch 208 may route data to one or more appropriate Ethernet drives 212. The Ethernet switch may be a specialized device configured to perform at least the functions described herein, and may thus efficiently route incoming data with little processing required beyond referencing the switch forwarding table 210. In one or more embodiments, the Ethernet switch 208 is not configured to modify entries of the switch forwarding table 210.

In one or more embodiments, the switch forwarding table 210 may be a data structure stored in computer memory that stores one or more matching rules and one or more corresponding action lists. The switch forwarding table 210 may be configured according to OpenFlow specifications. In one or more embodiments, modification of entries in the switch forwarding table 210 may be restricted (e.g. restricted to the controller 204), and the switch forwarding table 210 may be referenced by (e.g. may allow read functionality to) the Ethernet switch 208.

The switch forwarding table 210 may include matching rules for matching incoming data with one or more action lists. For example, the matching rules may specify one or more headers or content within a header of incoming data. The matching rules may be associated with one or more action lists that include a list of actions to be taken for data that satisfies the corresponding matching rules. For example, the action list can include a plurality of actions that are to be performed in sequence with the matched data. By way of example, a header of incoming data may reference a virtual IP address. The Ethernet switch 208 may reference the switch forwarding table 210 and determine that the virtual IP address satisfies a matching rule of the switch forwarding table. The Ethernet switch 208 may determine that a corresponding action list for the matching rule includes an action of storing the data at a particular physical address (e.g. in a particular namespace of a particular Ethernet drive 212). The Ethernet switch 208 may responsively store the incoming data at the specified particular physical address. Thus, the Ethernet switch can implement routing by referencing the switch forwarding table 210, and need not necessarily communicate directly with the controller 204.

In one or more embodiments, a plurality of Ethernet switches 208 may be implemented. The plurality of Ethernet switches 208 may reference a same switch forwarding table 210, or may reference respective switch forwarding tables 210 of a plurality of switch forwarding tables 210. The controller 204 may be configured to modify or create entries of the plurality of switch forwarding tables 210 using OpenFlow.

In one or more embodiments, the Ethernet drives 212 can each include an Ethernet NIC 214, a controller 216, and a NAND-type memory 218. The Ethernet NIC 214 can be configured to function as an interface between the Ethernet drive 212 and the Ethernet switch 208. The controller 216 can perform local functions, including read/write functions to the NAND-type memory 218. In one or more embodiments, the Ethernet drives 212 can be configured to communicate and/or to transfer data between each other (e.g. through the Ethernet switch 208). While the presently described embodiments implement an Ethernet drive 212 and an Ethernet switch 208, other types of drives and switches can be implemented in conjunction with the controller 204 and the switch forwarding table 210.

Thus configured, the data storage system 202 can provide for efficient routing and storage of data and for centralized control of the data storage system 202 through the controller 204. This can provide for improved performance and for virtualization of control of the data storage system 202.

Figure 3A:
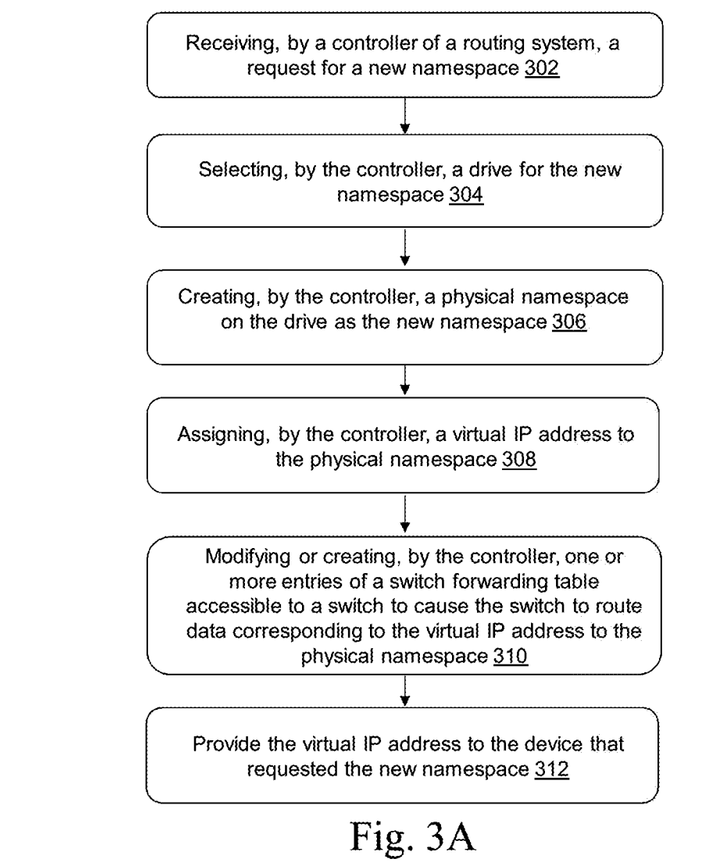
FIG. 3A shows a method for routing data to a new namespace according to one or more embodiments of the present disclosure.

Refer now to FIG. 3A, which shows an example method for creating a namespace on one of the Ethernet drives 212 of the data storage system 202. In a brief overview, the method includes steps 302-312. At step 302, the controller 204 receives a request to create a new namespace from an external host or device. At step 304, the controller 204 selects an Ethernet drive 212 for the new namespace. At step 306, the controller 204 creates a physical namespace on the Ethernet drive 212 as the new namespace. At step 308, the controller assigns a virtual IP address to the physical namespace. At step 310, the controller modifies or creates (e.g. using a SDN mechanism such as OpenFlow) one or more entries of the switch forwarding table to cause the Ethernet switch 208 to route data corresponding to the virtual IP address to the physical namespace. At step 312, the controller provides the virtual IP address to the device that requested the new namespace. Other embodiments contain additional or fewer steps than shown in FIG. 3A.

In more detail, at step 302, the controller 204 receives a request for a new namespace from a host or an external device or network. The request may include specifications for the namespace, such as a size of the namespace or a range of acceptable sizes, or a particular drive in which to create the namespace, or one or more types of acceptable drives in which to create the namespace. The request may specify a quality of service (QoS) and/or a service-level agreement (SLA). The request may be received via an interface provided to an administrator that allows for virtualized control of the data storage system 202.

At step 304, the controller 204 selects an Ethernet drive 212 for the new namespace. The controller may select the Ethernet drive 212 to satisfy requirements of the request received at step 302. For example, the controller 204 may reference a list of drives and associated characteristics (e.g. interface type, available space, memory type), and select a suitable Ethernet drive 212 based on the associated characteristics. If more than one drive satisfies the requirements of the request, the controller 204 may select a drive in accordance with a policy (e.g. a predetermined policy or a policy specified in the request).

At step 306, the controller 204 creates a physical namespace on the selected Ethernet drive 212 as the new namespace. The controller 204 may do this by implementing $I^2C$ functionality that allows the controller 204 to communicate with the Ethernet drive 212. The controller 204 may implement NVMe-MI protocol to create the physical namespace.

At step 308, the controller 204 assigns a virtual IP address to the physical namespace. The assignment may be done via L3 (layer 3 of the open systems interconnection (OSI) model) configuration of the Ethernet switch 208. For example, the controller 204 can use border gateway protocol (BGP) to route the virtual IP address to the physical namespace. Thus traffic to the virtual IP address may be forwarded to the physical namespace. This mapping may be stored in the mapping table 206. The virtual IP address may be used by an external host or device to reference the physical namespace and to direct routing of data to or from the physical namespace. This provides for virtualization of the data storage system 202 through the centralized controller 204.

At step 310, the controller 204 modifies or creates one or more entries of the switch forwarding table 210 using OpenFlow. Each entry of the switch forwarding table 210 may include a matching rule and a corresponding action list that includes one or more actions. The controller 204 may create an entry that includes a matching rule that references the assigned virtual IP address, and an action list that may include, for example, routing data to the physical namespace or retrieving data from the physical namespace (e.g. implementing read or write functions on the namespace). Alternatively, the controller 204 may modify an existing entry in the switch forwarding table 210 to achieve the same effect.

At step 312, the controller 204 provides the virtual IP address to the external host or device that requested the new namespace. Thus, the external host or device can reference the virtual IP address in other communications to interact with the created physical namespace, providing for virtualized control over the data storage system 202.

Figure 3B:
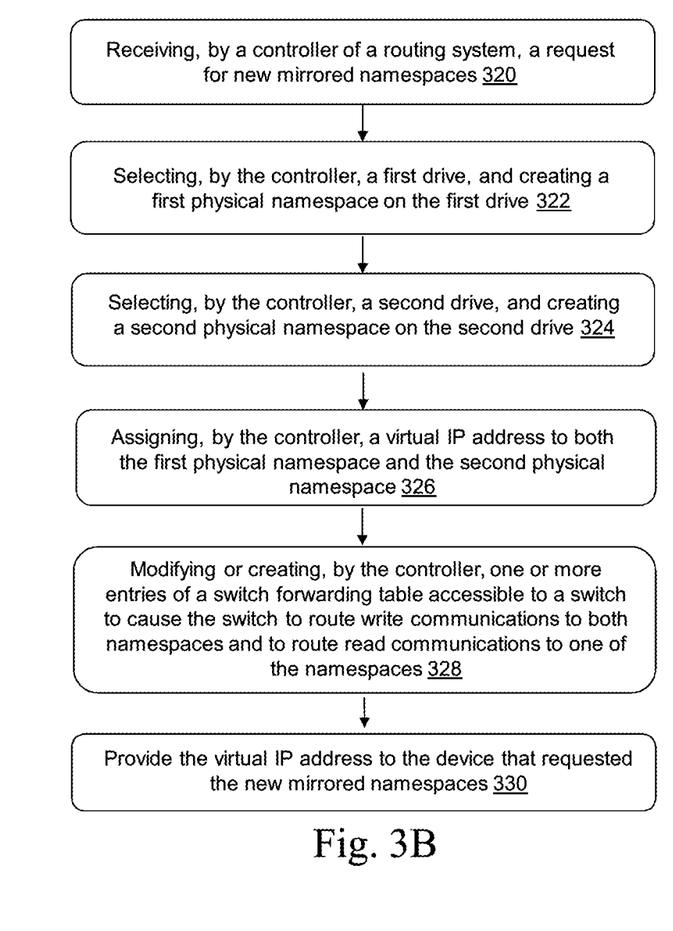
FIG. 3B shows a method for mirrored routing of data according to one or more embodiments of the present disclosure.

Refer now to FIG. 3B, which shows an example method for creating mirror namespaces using the data storage system 202. The method includes steps 320-330. In a brief overview, at step 320, the controller 204 receives a request from an external host or device to create new mirrored namespaces. At step 322, the controller 204 selects a first Ethernet drive 212 and creates a first physical namespace on the first Ethernet drive 212. At step 324, the controller 204 selects a second Ethernet drive 212 and creates a second physical namespace on the second Ethernet drive 212. At step 326, the controller 204 assigns a virtual IP address to both the first physical namespace and the second physical namespace. At step 328, the controller 204 modifies or creates one or more entries of the switch forwarding table 210 to cause the Ethernet switch 208 to route write communications to both namespaces and to route read communications to one of the name spaces. At step 330, the controller 204 provides the virtual IP address to the external host or device that requested the new mirrored namespaces. Other embodiments contain additional or fewer steps than shown in FIG. 3B.

In more detail, at step 320, the controller 204 receives a request from an external host or device to create new mirrored namespaces. The request may include specifications for the namespaces, such as a size of the namespaces or a range of acceptable sizes, or particular drives in which to create the namespaces, or one or more types of acceptable drives in which to create the namespaces. The request may specify a quality of service (QoS) and/or a service-level agreement (SLA). The request may be received via an interface provided to an administrator that allows for virtualized control of the data storage system 202.

At step 322, the controller 204 selects a first Ethernet drive 212 and creates a first physical namespace on the first Ethernet drive 212. The controller may select the first Ethernet drive 212 to satisfy requirements of the request received at step 320. For example, the controller 204 may reference a list of drives and associated characteristics (e.g. interface type, available space, memory type), and select a suitable Ethernet drive 212 based on the associated characteristics. If more than one drive satisfies the requirements of the request, the controller 204 may select a drive in accordance with a policy (e.g. a predetermined policy or a policy specified in the request). The controller 204 then creates a first physical namespace on the first Ethernet drive 212 as a new namespace. The controller 204 may do this by implementing $I^2C$ functionality that allows the controller 204 to communicate with the Ethernet drive 212. The controller 204 may implement NVMe-MI protocol to create the first physical namespace.

At step 324, the controller 204 selects a second Ethernet drive 212 and creates a second physical namespace on the second Ethernet drive 212. The controller may select the second Ethernet drive 212 to satisfy requirements of the request received at step 320. For example, the controller 204 may reference a list of drives and associated characteristics (e.g. interface type, available space, memory type), and select a suitable Ethernet drive 212 based on the associated characteristics. If more than one drive satisfies the requirements of the request, the controller 204 may select a drive in accordance with a policy (e.g. a predetermined policy or a policy specified in the request). The controller 204 then creates a second physical namespace on the second Ethernet drive 212 as a new namespace. The controller 204 may do this by implementing $I^2C$ functionality that allows the controller 204 to communicate with the Ethernet drive 212. The controller 204 may implement NVMe-MI protocol to create the second physical namespace.

At step 326, the controller 204 assigns a virtual IP address to both the first physical namespace and the second physical namespace. The assignment may be done via L3 (layer 3 of the open systems interconnection (OSI) model) configuration of the Ethernet switch 208. For example, the controller 204 can use border gateway protocol (BGP) to route the virtual IP address to the physical namespaces. Thus traffic to the virtual IP address may be forwarded to the physical namespaces. In other embodiments, the controller 204 can configure the Ethernet switch 208 for port mirroring to a secondary address via L2 (layer 2 of the OSI model) configuration. This mapping may be stored in the mapping table 206. The virtual IP address may be used by an external host or device to reference the physical namespace and to direct routing of data to or from the physical namespaces. This provides for virtualization of the data storage system 202 through the centralized controller 204.

At step 328, the controller 204 modifies or creates one or more entries of the switch forwarding table 210, using OpenFlow, to cause the Ethernet switch 208 to route write communications to both namespaces and to route read communications to one of the name spaces. Each entry of the switch forwarding table 210 may include a matching rule and a corresponding action list that includes one or more actions. The controller 204 may create an entry that includes a matching rule that references the assigned virtual IP address and that specifies a read command, and a corresponding action list that may include, for example, requesting data from one of the first physical namespace and the second physical namespace. The controller 204 may select the first physical namespace or the second physical namespace randomly (e.g. by referencing an output of a random number generator or by referencing a clock), or may select the physical namespace according to some policy (e.g. a round robin policy). The controller 204 may also create an entry that includes a matching rule that references the assigned virtual IP address and that specifies a write command, and a corresponding action list that may include, for example, storing data on both of the first physical namespace and the second physical namespace.

At step 330, the controller 204 provides the virtual IP address to the external host or device that requested the new mirrored namespaces. Thus, the external host or device can reference the virtual IP address in other communications to read or write to the created mirrored namespaces, providing for virtualized control over the data storage system 202.

Figure 4:
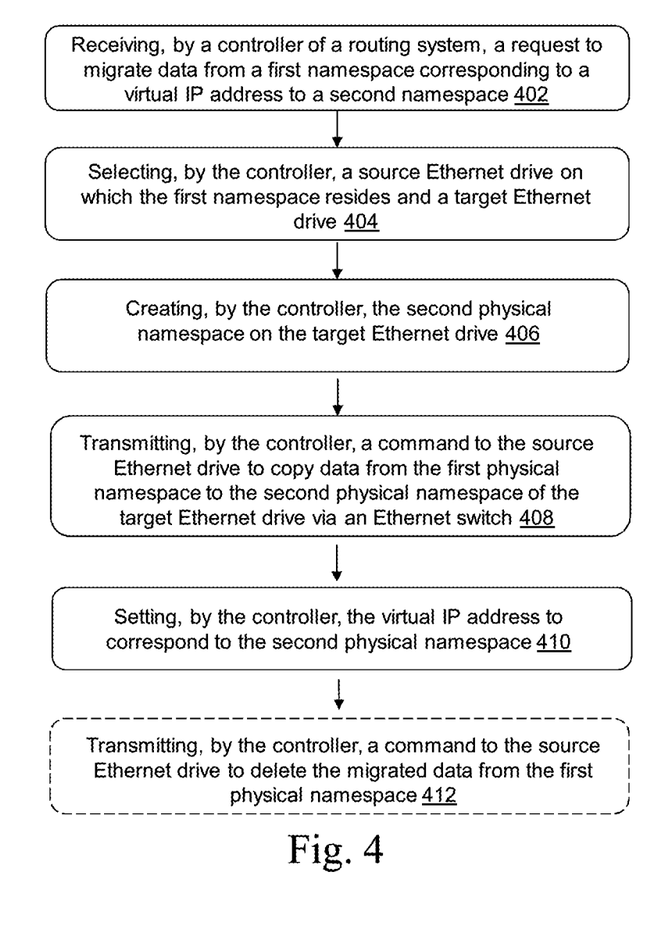
FIG. 4 shows a method for migrating data according to one or more embodiments of the present disclosure.

Refer now to FIG. 4, which shows an example method for migrating data using the data storage system 202. The method includes the steps 402-412 (with step 412 being optional). In a brief overview, at step 402, the controller 204 receives a request from an external host or device to migrate data from a first physical namespace corresponding to a virtual IP address to a second physical namespace. At step 404, the controller 204 selects a source Ethernet drive 212 on which the first physical namespace resides, and selects a target Ethernet drive 212. At step 406, the controller 204 creates the second physical namespace on the target Ethernet drive. At step 408, the controller 204 transmits a command to the source Ethernet drive 212 to copy data from the first physical namespace to the second physical namespace of the target Ethernet drive 212 using the Ethernet switch 208. At step 410 the controller 204 sets the virtual IP address to correspond to the second physical namespace. Optionally, at step 412, the controller 204 transmits a command to the source Ethernet drive 212 to delete the migrated data from the first physical namespace. Other embodiments contain additional or fewer steps than shown in FIG. 4.

In more detail, at step 402, the controller 204 receives a request from an external host or device to migrate data from a first physical namespace corresponding to a virtual IP address to a second physical namespace. The request may include specifications for the second physical namespace, such as a size of the namespace or a range of acceptable sizes, or a particular drive in which to create the second physical namespace, or one or more types of acceptable drives in which to create the second physical namespace. The request may specify a quality of service (QoS) and/or a service-level agreement (SLA). The request may be received via an interface provided to an administrator that allows for virtualized control of the data storage system 202.

At step 404, the controller 204 selects a source Ethernet drive 212 on which the first physical namespace resides, and selects a target Ethernet drive 212. The controller may select the target Ethernet drive 212 to satisfy requirements of the request received at step 402, and to have at least enough available space to accommodate the data to be migrated. For example, the controller 204 may reference a list of drives and associated characteristics (e.g. interface type, available space, memory type), and select a suitable target Ethernet drive 212 based on the associated characteristics. If more than one drive satisfies the requirements of the request, the controller 204 may select a drive in accordance with a policy (e.g. a predetermined policy or a policy specified in the request).

At step 406, the controller 204 creates the second physical namespace on the target Ethernet drive. The controller 204 may do this by implementing I²C functionality that allows the controller 204 to communicate with the target Ethernet drive 212. The controller 204 may instruct the target Ethernet drive 212 to create the second physical namespace to be at least large enough to accommodate the data to be migrated.

At step 408, the controller 204 transmits a command to the source Ethernet drive 212 to copy data from the first physical namespace to the second physical namespace of the target Ethernet drive 212 via the Ethernet switch 208. For example, the controller 204 instructs the source Ethernet drive 212 to transmit the data to be migrated to the target Ethernet drive 212 via Ethernet switch 208 along with an identifier (e.g. contained in a header) that identifies the migration process and identifies a physical address of the target Ethernet drive 212. The controller 204 may do this by implementing I²C functionality that allows the controller 204 to communicate with the source Ethernet drive 212. The source Ethernet drive 212 may transmit the data to be migrated to the specified physical address of the target Ethernet drive 212 via the Ethernet switch, responsive to receiving the instructions from the controller 204.

At step 410, the controller 204 sets the virtual IP address to correspond to the second physical namespace. The controller 204 may set the virtual IP address to correspond to the second physical namespace by updating the switch forwarding table 210. The virtual IP address may be used by an external host or device to reference the second physical namespace and to direct routing of data to or from the second physical namespace. This provides for virtualization of the data storage system 202 through the centralized controller 204.

Optionally, at step 412, the controller 204 transmits a command to the source Ethernet drive 212 to delete the migrated data from the first physical namespace. This can free up space on the source Ethernet drive 212 following the data migration. In other embodiments, a copy functionality can be implement by performing steps 402-410 and by not deleting the data on the source Ethernet drive 212.

Thus, the data storage system 202 can provide for virtualized control over an efficient method of migrating data (or copying data). The data being migrated or copied need not pass through the controller 204.

Figure 5:
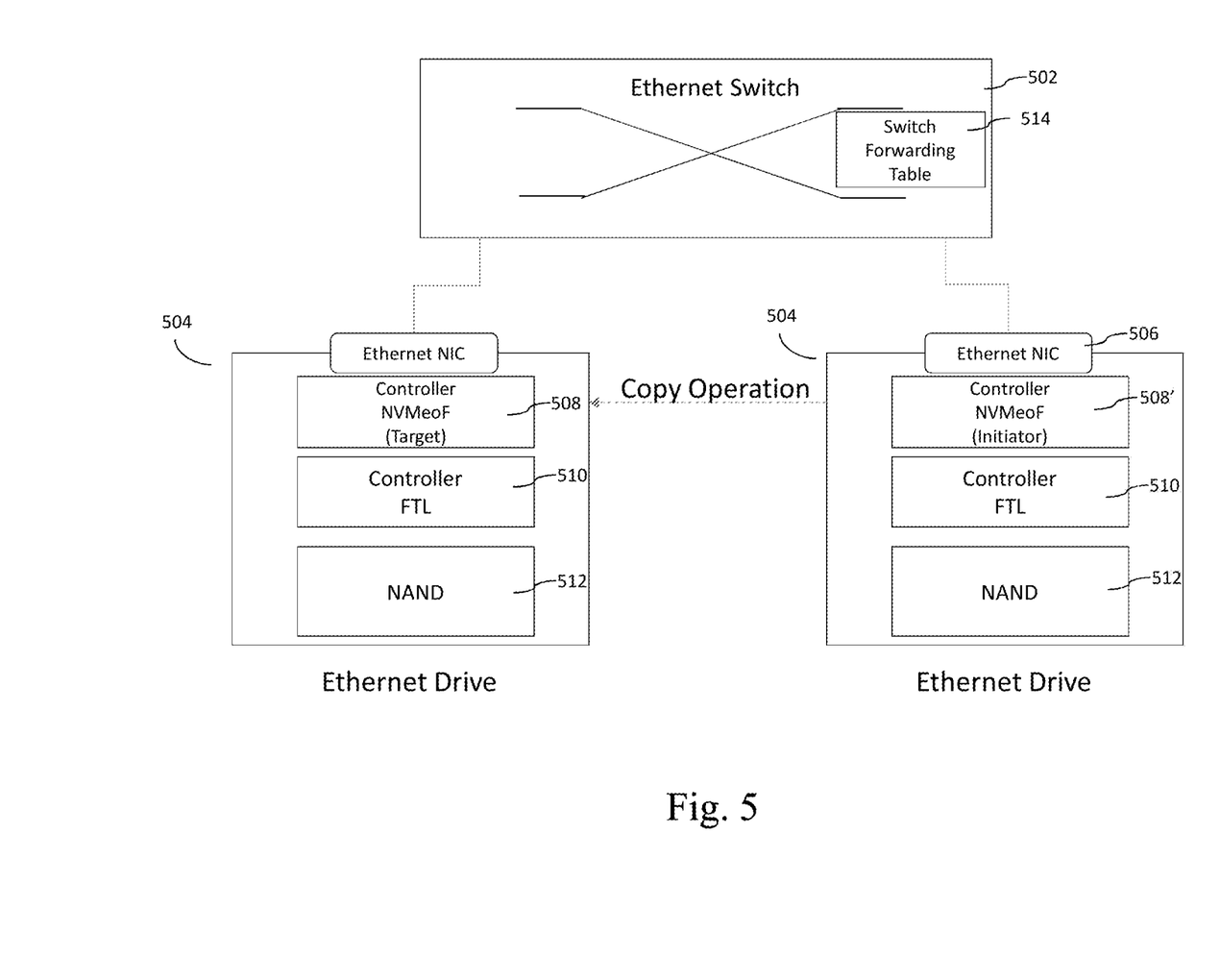
FIG. 5 is a block diagram showing a system for copying data according to one or more embodiments of the present disclosure.

Refer now to FIG. 5, which shows an example system for performing a copying or data migration process, such as the process shown in FIG. 4 and described above. The system includes an Ethernet switch 502 (which may be similar to, or the same as, the Ethernet switch 208), a switch forwarding table 514 (which may be similar to, or the same as, the switch forwarding table 210), and two Ethernet drives 504. The Ethernet drives 504 may each include an Ethernet NIC 506, a controller FTL 510, and a NAND-type memory 512. Other embodiments contain additional or fewer components than shown in FIG. 5.

One of the Ethernet drives 504, functioning as a target drive, includes a controller 508 configured for NVMeoF functionality. The controller 508 is configured to act as a target for a copy or migration process (e.g. to receive and store the copied or migrated data). The other Ethernet drive 504, functioning as a source drive, includes a controller 508' configured for NVMeoF functionality. The controller 508' is configured to act as an initiator for a copy or migration process (e.g. to transmit the data to be copied or migrated to the Ethernet switch 502, along with an identifier of the copy or migration process). In some implementations, both the Ethernet drives 504 include controllers configured to functions as both initiators and as targets. The controller 204 may instruct the initiator Ethernet drive 504 to initiate an NVMeoF session with the target Ethernet drive 504.

This provides for a flexible system in which data can be readily copied or migrated between Ethernet drives as needed. Such Ethernet drives can be implemented in the data storage system 202.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. A method for storing data, comprising:
receiving, by a controller of a storage system, a request for a new namespace;
selecting, by the controller, a first drive for the new namespace for which the request was received;
creating, by the controller, a first physical namespace on the first drive as the new namespace for which the request was received;
assigning, by the controller, a virtual internet protocol (IP) address to the first physical namespace;
modifying or creating, by the controller, one or more entries of a switch forwarding table accessible to a switch to cause the switch to route data corresponding to the virtual IP address to the first physical namespace.

2. The method of claim 1, wherein the request is a request for mirrored namespaces, and the method further comprises:
selecting, by the controller, a second physical namespace on a second drive; and assigning, by the controller, the virtual IP address to the second physical namespace, and wherein modifying or creating the one or more entries of the switch forwarding table comprises modifying the one or more entries of the switch forwarding table to cause the switch to route write communications corresponding to the virtual IP address to both the first physical namespace and the second physical namespace, and to route read communications to one of the first physical namespace and the second physical namespace.

3. The method of claim 1, wherein the request for a new namespace is received from a device, and further comprising:

storing an indication of a correspondence between the first physical namespace and the virtual IP address in a mapping table; and providing the virtual IP address to the device that requested the new namespace.

4. The method of claim 1, wherein creating, by the controller, the first physical namespace on the selected drive comprises is performed using a non-volatile memory express management interface (NVMe-MI) configuration.

5. The method of claim 1, further comprising communicatively connecting, by the controller, to the first drive using inter-integrated circuit (I$^2$C) connectivity, or configuring the first drive using a non-volatile memory express management interface (NVMe-MI).

6. The method of claim 1, further comprising receiving, by the controller, out-of-band data routing instructions.

7. The method of claim 1, wherein modifying or creating entries of the switch forwarding table include instructing insertion or deletion of forwarding rules.

8. The method of claim 1, wherein modifying or creating entries of the switch forwarding table includes setting an expiry date for one or more forwarding rules of the switch forwarding table.

9. The method of claim 1, wherein modifying or creating entries of the switch forwarding table includes managing forwarding rules of the switch forwarding table using an OpenFlow protocol.

10. The method of claim 1, wherein the switch forwarding table includes one or more matching rules and one or more action lists respectively corresponding to the one or more matching rules.

11. The method of claim 10, wherein the one or more actions includes at least one of forwarding a data packet to a specific switch port, dropping the data packet, sending the data packet to the controller, or modifying the data packet.

12. A system for storing data, comprising:

a plurality of Ethernet drives;

an Ethernet switch that is configured to route data using a switch forwarding table for storing data in the Ethernet drives; and a controller that is configured to:

receive a request for a new namespace;

select a first one of the Ethernet drives for the new namespace for which the request was received;

create a first physical namespace on the first Ethernet drive as the new namespace for which the request was received;

assign a virtual internet protocol (IP) address to the first physical namespace;

modify or create one or more entries of the switch forwarding table accessible to the Ethernet switch to cause the Ethernet switch to route data corresponding to the virtual IP address to the first physical namespace.

13. The system of claim 12, wherein the controller is further configured to communicatively connect to and configure the Ethernet drives.

14. The system of claim 13, wherein the controller is further configured to communicatively connect to the Ethernet drives using inter-integrated circuit (I$^2$C) connectivity, or to configure the Ethernet drives using a non-volatile memory express management interface (NVMe-MI).

15. The system of claim 12, wherein the controller is further configured to receive out-of-band data routing instructions.

16. The system of claim 12, wherein the controller is further configured to modify or create the entries of the switch forwarding table by instructing insertion or deletion of forwarding rules.

17. The system of claim 16, wherein the controller is further configured to manage the forwarding rules of the switch forwarding table using an OpenFlow protocol.

* * * * *